United States Patent
Quinzin et al.

(10) Patent No.: US 10,108,786 B2
(45) Date of Patent: Oct. 23, 2018

(54) PROCESS AND DEVICE FOR ENCODING OF SOURCE FILES FOR SECURE DELIVERY OF SOURCE CODE

(71) Applicant: BULL SAS, Les Clayes-sous-Bois (FR)

(72) Inventors: Maxime Quinzin, Grenoble (FR); Louis Davy, Poisat (FR); Philippe Couvee, Villard-Bonnot (FR)

(73) Assignee: BULL SAS, Les Clayes sous Bois (FR)

( * ) Notice: Subject to any disclaimer, the term of this patent is extended or adjusted under 35 U.S.C. 154(b) by 0 days.

(21) Appl. No.: 14/744,199

(22) Filed: Jun. 19, 2015

(65) Prior Publication Data

US 2015/0371012 A1 Dec. 24, 2015

(30) Foreign Application Priority Data

Jun. 20, 2014 (FR) ...................................... 14 55735

(51) Int. Cl.
  *H04L 9/14* (2006.01)
  *G06F 21/10* (2013.01)
  *G06F 21/12* (2013.01)
  *G06F 21/62* (2013.01)

(52) U.S. Cl.
  CPC ............. *G06F 21/10* (2013.01); *G06F 21/12* (2013.01); *G06F 21/6218* (2013.01); *H04L 9/14* (2013.01); *G06F 2221/0724* (2013.01); *G06F 2221/2107* (2013.01)

(58) Field of Classification Search
  CPC ...... G06F 21/10; G06F 21/12; G06F 21/6218; G06F 2221/0724; G06F 2221/2107; H04L 9/14
  See application file for complete search history.

(56) References Cited

U.S. PATENT DOCUMENTS

| | | | |
|---|---|---|---|
| 6,684,389 B1 | 1/2004 | Tanaka et al. | |
| 9,330,253 B2* | 5/2016 | Lee | G06F 21/51 |
| 9,342,699 B2* | 5/2016 | Bowman | G11B 20/0021 |
| 2002/0067833 A1 | 6/2002 | Han et al. | |
| 2012/0185701 A1* | 7/2012 | Balinsky | G06F 21/6209 |
| | | | 713/193 |

OTHER PUBLICATIONS

Preliminary Search Report as issued in French Patent Application No. 1455735, dated Mar. 10, 2015.

* cited by examiner

*Primary Examiner* — Beemnet Dada
(74) *Attorney, Agent, or Firm* — Pillsbury Winthrop Shaw Pittman LLP

(57) ABSTRACT

A computer implemented process of encoding of at least one source file for obtaining an executable binary file that is executable by compilation of the at least one source file according to at least one instruction file, the process including: obtaining the at least one source file and the at least one instruction file; obtaining a plurality of encryption keys, at least two keys from the plurality of encryption keys being of different types, each type of encryption key being associated with a particular access right to the at least one source file; selecting each of the keys from the plurality of encryption keys and encrypting the source file according to the key selected and generating the source file encrypted according to the key selected; generating a package containing the at least one instruction file and the source files encrypted according to each key of the plurality of encryption keys.

14 Claims, 2 Drawing Sheets

Fig. 1

PROCESS AND DEVICE FOR ENCODING OF SOURCE FILES FOR SECURE DELIVERY OF SOURCE CODE

CROSS-REFERENCE TO RELATED APPLICATIONS

This application claims priority to French Application No. 1455735, filed Jun. 20, 2014, the content of which is incorporated herein by reference in its entirety.

FIELD

This present invention relates to the delivery of software application source code permitting compilation of the software applications, and more specifically to a process and a device for encoding of source files for the secure delivery of source code in order to permit, notably, limiting access, in a separate manner, to the reading and compilation of files containing this source code to authorized users, such as users in possession of decryption keys.

BACKGROUND

Software applications are generally developed in a source language, such as C language. They often include a set of basic operations or independent or partially dependent tools. Typically, a developer or a team of developers writes files in source language and then compiles these files, according to a particular target corresponding to an execution environment, with the necessary files, notably header files and files containing compilation instructions.

Compilation produces a set of executable files representing a basic application or a tool of the targeted application. After compilation, the basic application or the tool may be installed, tested and then used. If an error is detected or if certain aspects must be improved, the source code files (or some of these files) are modified. They must then be recompiled and reinstalled.

In the field of software applications known as open or open-source applications, software applications are often delivered in the form of packages.

In Red Hat Linux (Red Hat and Linux are trademarks), there is an application management tool called RPM (Red Hat Package Manager) that permits, notably, installing and updating applications using simple commands. The packages used to deliver software applications in Red Hat Linux are often inaccurately called RPMs.

An RPM includes a set of files constituting an application. For one application, there are generally several RPMs corresponding to different versions of the latter.

Each RPM is produced from a source RPM, noted as src.rpm, containing a set of files of source code, permitting the application to be generated for different execution environments. The source RPM includes not only the source files, such as code files (*.c) and header or definition files (*.h) permitting compilation of the corresponding application, but also a set of files, called spec, used for compilation, some of which files define the order of compilation of the source code files as well as of the files permitting installation of the application.

In addition, it is observed that, in the context of certain installations, typically in a complex installation, certain software components may not be open (i.e., open source) and that as a result, the corresponding files containing the source code, called proprietary source code, are not in principle accessible to clients. However, in certain circumstances, for example, according to specific contractual clauses, a client may request the right to access the proprietary source code, in order to examine it, for example, or to be able to recompile the application.

In addition, the presence of proprietary source code on a site may be of particular interest. By way of illustration, in the event of significant problems, a maintenance team from the company that provided the software application may need components of proprietary source code in order to recompile the application locally after correction of the problem.

Thus, certain clients must have access to the proprietary source code, and this access must be blocked to other users.

In addition, it is observed that, for security reasons, maintenance teams may be prohibited from traveling with a data recording medium containing files of any kind. In other words, the files containing the proprietary source code should be obtained independently from the maintenance teams using them.

As recalled above, the RPM sources include, in particular, source code files and header or definition files. Thus, a user in possession of an RPM source file may, in a very simple manner, open it in order to explore its content and/or compile it. It is observed here that certain RPM sources may be signed using a cryptographic key permitting verification of their integrity. However, these signature mechanisms do not make it possible to selectively limit access to each file or compilation of the files.

SUMMARY

There is thus a need to authorize delivery of source code files and manage their access, notably .access to content and to compilation, in a selective manner.

An aspect of the invention permits resolving at least one of the problems presented above.

An aspect of the invention is directed to a computer implemented process of encoding of at least one source file necessary for obtaining at least one executable binary file that is executable by compilation of the at least one source file according to at least one instruction file, the process including, obtaining the at least one source file and the at least one instruction file;

obtaining a plurality of encryption keys, at least two keys from the plurality of encryption keys being of different types, each type of encryption key being associated with a particular access right to the at least one source file;

selecting each of the keys from the plurality of encryption keys and encrypting the at least one source file according to the key selected and generating the at least one source file encrypted according to the key selected;

generating a package containing the at least one instruction file and the source files encrypted according to each key of the plurality of encryption keys.

The process according to an embodiment of the invention thus permits the secure delivery of source codes to a client or to any another person, while protecting, notably, in a separate manner, its content and the possibility of compiling it.

Thus, in an embodiment, a source file is encrypted with each of the plurality of encryption keys to generate an encrypted source file, which one can be decrypted with any of the encryption key. Depending on the encryption key used, users will not have the same access rights.

According to a particular embodiment, the process further includes a step of obtaining at least one source file to which access is free, the generated package containing the at least one source file obtained to which access is free. The process according to an embodiment of the invention thus permits the secure delivery of source codes containing proprietary code that must be protected and free code for which protection is not necessary.

Again according to a particular embodiment, the step of encryption, executed for each key of the plurality of keys, further includes a step of compression of the at least one source file. The process according to an embodiment of the invention thus permits optimizing the processing and volume of data to transmit.

Again according to a particular embodiment, the process is used for the encoding of a plurality of source files, the source files of the plurality of source files being organized in a tree structure, at least one key of the plurality of cryptographic keys being associated with at least one node of the tree structure, the at least one key associated with the at least one node being used to encrypt all of the source files associated with this node and with the lower-level nodes connected to this node.

The process according to an embodiment of the invention thus permits controlling access to data, in editing or compilation, for example, according to a hierarchical data structure.

Again according to a particular embodiment, the process further includes a step of transmission of the package generated.

Another aspect of the invention is a computer implemented process of decoding of a package generated according to the encoding process described previously, the decoding process including:
  receiving a source package;
  obtaining a cryptographic key; and
  selecting and decrypting at least one set of data from the source package received.

The process according to an embodiment of the invention thus permits the secure receipt of source codes by a client or by any another person, while protecting, notably, in a separate manner, its content and the possibility of compiling it.

According to a particular embodiment, the, process further includes a step of compilation of data resulting from the step of decryption of the set of data.

According to a particular embodiment, the process further includes a step of editing of data resulting from the said step of decryption of the said set of data.

Another aspect of the invention is a computer program containing instructions appropriate for the implementation of each step of the processes described previously when the program is executed on a computer as well as on a computerized device containing components appropriate for the implementation of each step of the processes described previously. The computer program may be implemented in a non-transitory computer readable medium, such as for example, a physical memory. In this embodiment, the computer readable medium is coded with the machine executable instructions for carrying out the above steps of the methods and procedures.

The benefits procured by this computer program and this device are similar to those mentioned previously.

BRIEF DESCRIPTION OF THE DRAWINGS

Other benefits, goals and characteristics of the present invention appear in the following detailed description, provided as a non-restrictive example, with regard to the attached drawings in which.

DETAILED DESCRIPTION

According to a particular embodiment, an encryption mechanism, for example with several levels, is used at the time of source package creation, such as at the time of creation of source RPMs. All source packages, more generally called sources hereinafter, may be distributed without particular restriction, In the absence of specific rights, a user in possession of this source may access only a limited number of data, such as header information from the source (e.g., name of source code file and software version).

Decryption keys are used to access the source code files, according to a level of access associated with each key. Thus, according to the available key, it may be possible to access the content of a source or to compile this source.

These decryption keys are known to members of the distributor's application support and/or to clients, based on the needs of each and, typically, on contractual clauses.

A compression function is beneficially combined with that of encryption at the time of source package creation.

Thus, an embodiment of the invention makes it possible to simplify and make uniform the delivery of sources because all sources, open (i.e., open source) or proprietary, may be delivered without restrictions or distinctions to all players.

In this way, the proprietary sources are protected (i.e., they are not accessible to clients who do not have the corresponding decryption key), but are accessible to support teams.

Figure 1:
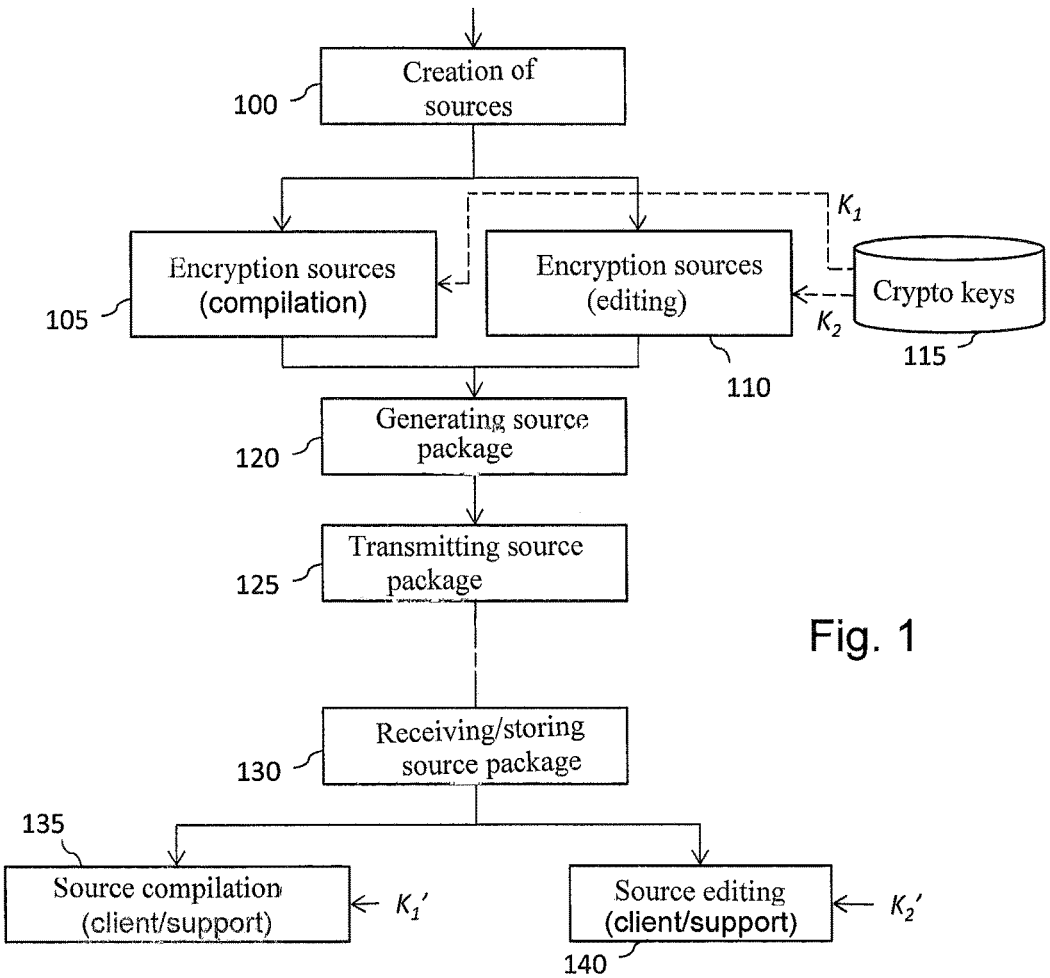
FIG. 1 illustrates certain steps of an algorithm permitting the transmission of sources for the purpose of editing or compiling them, according to a particular embodiment of the invention.

FIG. 1 illustrates certain steps of an algorithm permitting the transmission of sources for the purpose of editing or compiling them, according to a particular embodiment of the invention. This specific algorithm can be implemented by way of machine executable instructions to carry out or cause to carry out each step or function of the algorithm. The machine executable instructions can be embedded in a computer or machine readable medium that is coupled to or part of a physical computer. The machine executable instructions, when executed by a physical processor or a physical computer carry out or cause to carry out each step or function of the algorithm.

As illustrated, the object of a first step is the creation of sources (step 100). This step is essentially aimed at writing source code and combining the files necessary for the compilation of an application of or a component of an application (that is, in particular, source code files, header and definition files and files containing compilation instructions).

In the following steps, performed in parallel in an embodiment, the sources are encrypted according to one or more cryptographic keys corresponding to different levels of access. Specific machine executable instructions are used to carry out or cause to carry out the encryption.

Figure 4:
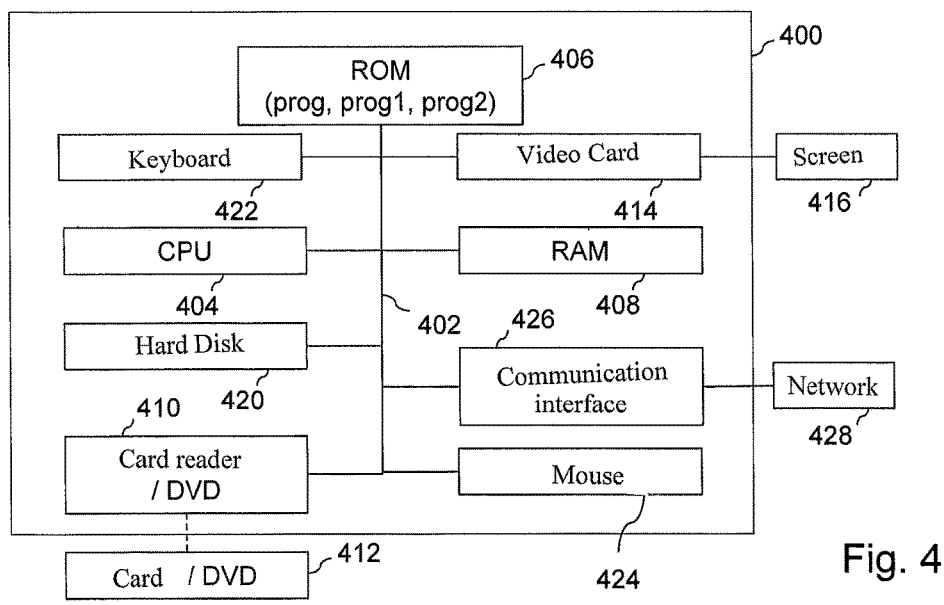
FIG. 4 illustrates an example of an information processing device appropriate for implementing, at least partially, an embodiment of the invention.

According to the example illustrated in FIG. 1, the sources are encrypted in two different ways, with two cryptographic keys of different types ($K_1$ and $K_2$). The first encryption (step 105), performed using the key $K_1$, aims here to permit the compilation of sources, while the second encryption (step 100), performed with the key $K_2$, also permits editing of sources (or of certain sources). The cryptographic keys used are stored here in a database 115. As will be appreciated by one skilled in the art, the database can be implemented in a physical memory that can be part of, or remotely located from, the physical computer that executes the machine executable instructions for implementing the algorithm. The computer may include various modules for executing the machine executable instructions. The modules may be distributed in that they are not part of a stand-alone computer unit. Alternatively, the modules may be part of a stand-alone computer unit. FIG. 4 described hereinafter shows various components or modules of the computer.

Other levels may be used to, for example, permit selective editing accesses to certain sources. By way of illustration, a first cryptographic key could be used to edit a first set of sources, while a second cryptographic key would be used to edit a second set of sources.

It is recalled here that data encryption is intended to encode these data to render them unintelligible. Only those who have the corresponding decoder, typically a standard decryption application and a particular key, may decrypt the data, which may then be transmitted securely.

According to a particular embodiment, the encryption implemented is asymmetric, also called public-key encryption. According to this type of encryption, a public key permits encrypting data, while a private key permits decrypting them. In other words, a sender uses an addressee or recipient's public key to encrypt data that only the addressee or recipient, in possession of the private key, can decrypt (thus ensuring the confidentiality of the content).

It is noted here that the encryption steps (e.g., steps 105 and 100) may be combined with data compression steps (not represented) in order to reduce the volume of data to transmit. Machine executable instructions can be used to carry out or cause to carry out the compression step(s).

In a next step, the encrypted sources are combined in a package with one or more files, for example, one or more compilation files (step 120). Machine executable instructions can be used to carry out or cause to carry out the combination step(s).

The source package is then transmitted to its addressee(s) (step 125), typically one or more clients. Machine executable instructions can be used to carry out or cause to carry out the transmission step(s).

After receipt and, generally, storage (step 130), the source package may be used, for example to compile or edit the source files it contains. Thus, for example, if a user has a cryptographic key enabling him to compile the sources, typically a private cryptographic key $K_1'$ with which is associated the public key $K_1$ having been used to encrypt the sources in order to permit their compilation, this user may compile the sources (step 135), alone or with other sources, whether this user is a client or belongs to a support team. Machine executable instructions can be used to carry out or cause to carry out the compiling and editing step(s).

As described previously and according to a particular embodiment, even if a user can access the sources for compilation purposes only, he may nevertheless, preferably, access certain information from the sources, for example, consult the header data including, notably, the names and versions of the source files.

Similarly, if a user has a cryptographic key enabling him to edit the sources, for example, a private cryptographic key $K_2'$, with which is associated the public key $K_2$ having been used to encrypt the sources to permit their editing, this user may edit the sources (step 140), alone or with other sources, whether this user is a client or belongs to a support team.

Thus, when sources have been received and stored during a step 130, they may then be accessible only for compilation purposes for certain users, for editing purposes for other users, based on the key each user has, or accessible for neither compilation nor editing purposes if the recipient of the sources does not have at least one corresponding key.

When a source package is received, the choice of data to decrypt may be made, for example, according to the key used, which may include an indication concerning its type (e.g., decryption for a compilation operation or decryption for an editing operation), a choice of the user, or by decryption attempts.

According to an embodiment of the invention, a program of generation of compressed source files of an application is modified in order to integrate in it an encryption step, protecting reading and/or compilation access. Two levels of access associated with cryptographic keys are, in an embodiment, implemented:

the first level using full access keys: these keys permit installing compressed source files and offer a standard access to the sources to read and/or compile them;

the second level using restricted access keys (e.g., compilation only): these keys permit only compilation of source files to produce corresponding binary files (executable files). Editing of sources is not possible here. Furthermore, the sources are preferably not installed.

It is observed here that many operating systems offer tools that permit generating compressed files, called compressed source package hereinafter, consisting of files containing, on the one hand, the compressed sources of an application, and on the other hand, files describing how to compile these files (compilation rules or instructions). The compilation itself of the sources, based on the compilation rules, is performed by other tools.

Figure 2:
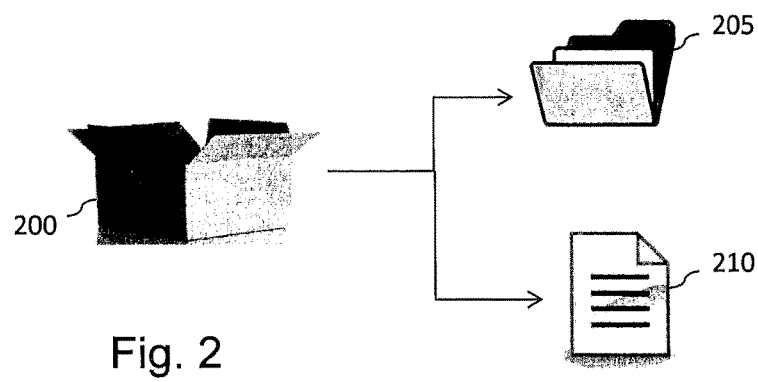
FIG. 2 illustrates schematically the organization of a compressed source package according to an embodiment of the invention.

FIG. 2 illustrates schematically the organization of a compressed source package 200 containing compressed source files, referenced as 205, and files 210 containing compilation instructions.

As described previously, RPM is a software packet management system that is used on certain GNU and Linux distributions. The system consists of an open format and a free software for manipulation of files in this format (which is used by Linux Standard Base, LSB).

RPM is used in command line or with a graphical interface. It makes it possible to install, uninstall, verify, query and update software packages. Each software package consists of an archive of files and information regarding the package, in particular its license, its version, its description and its dependencies.

A source RPM is typically created by using a command known under the name 'rpmbuild' with the option —bs. The file extension thus created is 'src.rpm'. Generally, then, there are two ways to compile a source RPM in order to produce one or more binary RPMs.

According to a first method, the source RPM is installed using a command known under the name 'rpm' with the option —i. The archive of source files and the 'spec' file are placed in a specific tree structure. Editing of source files is thus possible. It is also possible to compile this set of source files (archive) and this 'spec' file using a command known under the name 'rpmbuild' with the option —bb.

According to a second method, the source RPM is compiled directly using the command 'rpmbuild' with the option —rebuild. In this case, the source files containing the code are not installed in the system. They may thus not be edited.

The binary RPM(s) thus created may then be installed on a Linux system by using the command 'rpm' with the option —i.

According to a particular embodiment of the invention, the commands of creation and compilation of compressed source files and the commands of installation of source files on a system are modified to protect access to the sources.

A first modification aims at the function related to the compression of source files in order to encrypt them at the time of their compression. For these purposes, simple encryption software libraries may be used.

Thus, for example, two options that may be named —keycompileonly <key> and —keyall <key> may be added to the command of creation of compressed source file. These options permit, on the one hand, indicating an encryption command, and on the other hand, sending the cryptographic keys to be used to the encryption function that must be used. According to this example, one of these two keys gives access to compilation only and the other gives full access.

By way of illustration, implementation of an embodiment of the invention in the RPM manager, according to a particular embodiment, leads to the use of the command rpmbuild with the options —bs —keycompileonly <key> and —keyall <key>. Its execution generates an encrypted RPM source that may be decrypted using two different keys, offering different levels of access.

A second modification concerns the function of installation of compressed source files permitting later access to the sources.

The command of installation of compressed source files is modified here so that it can receive a decryption key, the purpose of the latter being to offer full access to the sources (compilation and reading).

Thus, for example, one option that could be named —keyall <key> may be added to this command in order to authorize the installation of source files on the system, if permitted by the provided key, for reading or compilation. If the key is not valid, the installation is refused.

By way of illustration, the implementation of an embodiment of the invention in the RPM manager, according to a particular embodiment, leads to the modification of the command rpm in order to make it impossible to install an encrypted RPM source without a full-access decryption key.

Finally, a third modification concerns the function of compilation of compressed source files so that it can receive a decryption key (which does not permit direct recompilation).

Thus, for example, an option that could be named —keycompileonly <key> may be added to this command in order to authorize direct compilation of an encrypted and compressed source file, if permitted by the provided key. If the key is not valid, the compilation is refused.

By way of illustration, the implementation of an embodiment of the invention in the RPM manager, according to a particular embodiment, leads to the modification of the command rpmbuild to prohibit direct compilation of an encrypted and compressed source file without a specific decryption key for compilation.

Although the example presented here is based on the use of two cryptographic keys of different types, one permitting full access to the sources and the other an access for compilation only, it is possible to define particular rules. According to a particular embodiment, the key permitting full access to the sources permits direct compilation of the sources from compressed source files (without going through a decompression step controlled by a user, i.e., without calling on two distinct functions, one of decompression and the other of compilation).

Likewise, other types of cryptographic keys may be used. In particular, it may be envisioned to use several cryptographic keys organized in a tree structure, each key being associated with a node of the tree structure and permitting access to all sources associated with lower-level nodes, the source files also being organized according to the same tree structure.

Figure 3:
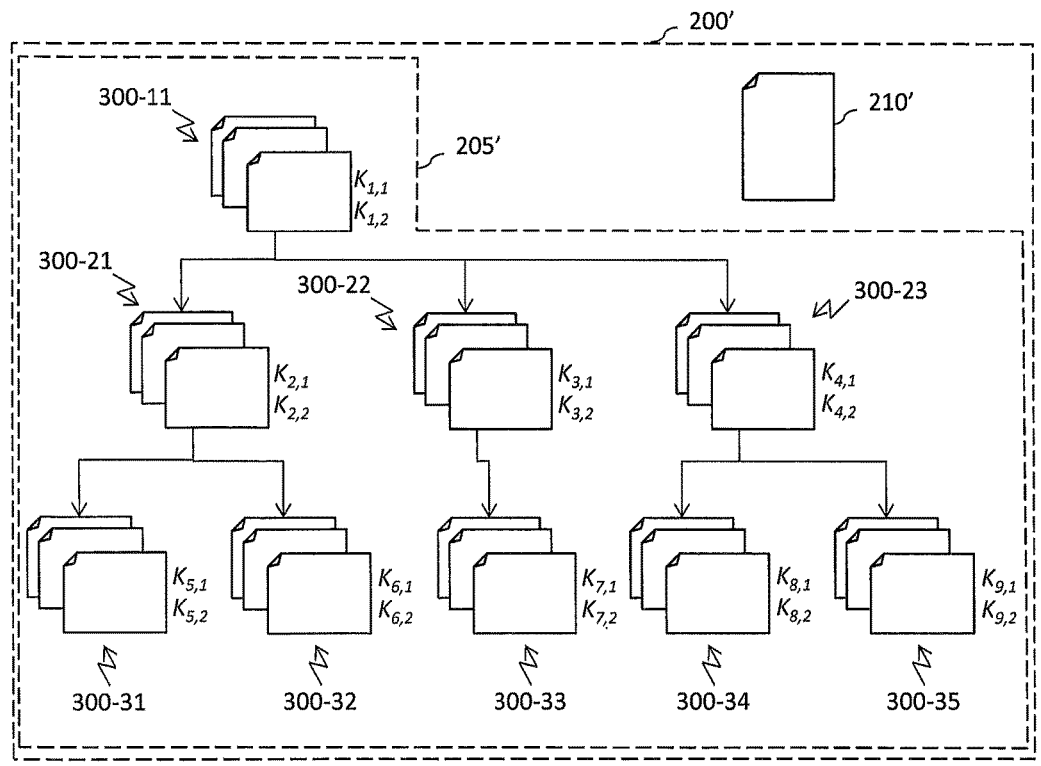
FIG. 3 illustrates schematically the organization of a compressed source package such as the one illustrated in FIG. 2, containing compressed source files and files containing compilation instructions, the compressed source files being organized in a hierarchical tree structure, and the access, editing and/or compilation rights being managed by hierarchical level, according to an embodiment of the invention.

FIG. 3 illustrates schematically the organization of a compressed source package 200' such as the one illustrated in FIG. 2, according to an embodiment, containing the compressed source files, referenced as 205' and files 210' containing compilation instructions, the compressed .source files being organized in a hierarchical tree structure, and the access, editing and/or compilation rights being managed by hierarchical level.

As illustrated, the hierarchical tree structure of the compressed source files here includes three levels.

The first level includes a single node to which are attached the compressed source files 300-11, the cryptographic keys $K_{1,1}$ and $K_{1,2}$ being associated with these compressed source files.

The second level includes here three nodes connected to the node of the first level. The compressed source files 300-21, 300-22 and 300-23, associated with the pairs of cryptographic keys ($K_{2,1}$ and $K_{2,2}$), ($K_{3,1}$ and $K_{3,2}$) and ($K_{4,1}$ and $K_{4,2}$), respectively, are attached to the first, second and third nodes of the second level, respectively.

Likewise, the third level here includes five nodes. The first two nodes of the third level are connected to the first node of the second level, the third node of the third level is connected to the second node of the second level and the last two nodes of the third level are connected to the third node of the second level. The compressed source files 300-31 to 300-35, associated with the pairs of cryptographic keys ($K_{5,1}$ and $K_{5,2}$) to ($K_{9,1}$ and $K_{9,2}$), respectively, are attached to the first, second, third, fourth and fifth nodes of the third level, respectively.

According to a particular implementation of the invention, a cryptographic key $K_{i,1}$ associated with a particular node gives access, in direct compilation, to all compressed source files associated with nodes of levels lower than this node and connected to the latter.

Thus, for example, the cryptographic key $K_{2,1}$ gives access, in direct compilation, to the compressed source files 300-21, 300-31 and 300-32.

Similarly, a cryptographic key $K_{1,2}$ associated with a particular node gives access, in editing, to all compressed source files associated with nodes of levels lower than this node and connected to the latter.

Thus, for example, the cryptographic key $K_{3,2}$ here gives access, in editing, to the compressed source files 300-22 and 300-33.

According to the illustrated example of FIG. 3, the cryptographic key $K_{1,1}$ gives access, in direct compilation, to all compressed source files 300-11, 300-21 to 300-23 and 300-31 to 300-35 and the cryptographic key $K_{1,2}$ gives access, in editing, to all compressed source files 300-11, 300-21 to 300-23 and 300-31 to 300-35.

To permit selective access to compressed source files, the source files may be duplicated and combined by branch, before compression, and then compressed and encrypted using the corresponding keys.

It is observed here that the cryptographic keys used to encrypt files may be common to several addressees/recipients or, on the contrary, specific to each addressee/recipient or user.

FIG. 4 illustrates an example of a computerized device that can be used to implement, at least partially, an embodiment, notably steps described in reference to FIGS. 2 and 3. The device 400 is, for example, a physical server.

The device 400 includes a communication bus 402 to which are attached:
- a central processing unit or microprocessor 404 (CPU);
- a read-only memory 406 (ROM) that may contain the operating system and programs such as "Prog";
- a random access memory (RAM) or cache memory 408 containing registers appropriate for recording variables and parameters created and modified during execution of the aforementioned programs;
- a reader 410 of removable storage medium 412 such as a memory card or a disk, for example a DVD; and
- a graphics card 414 connected to a screen 416.

Optionally, the device 400 may also have the following components:
- a hard disk 420 that may contain the aforementioned "Prog" programs and data processed or to be processed according to an embodiment of the invention;
- a keyboard 422 and a mouse 424 or any other pointing device such as a light pen, a touch screen or a remote control permitting the user to interact with programs according to the invention; and
- a communication interface 426 connected to a communication network 428, such as the Internet, the interface being capable of transmitting and receiving data.

The communication bus permits communication and interoperability between the various components included in or connected to the device 400. The bus representation is not restrictive and, notably the central unit is capable of communicating instructions to any component of the device 400 directly or via another component of the device 400.

The executable code (or computer/machine executable instructions) of each program permitting the programmable device to implement the processes according to an embodiment of the invention, may be stored, for example, in the hard disk 420 or in read-only memory 406.

According to a variant, the executable code (or computer/machine executable instructions) of the programs may be received through the communication network 428, via the interface 426, to be stored in a manner identical to the one described previously.

More generally, it will be possible to load the program(s) in one of the storage components or medium of the device 400 before being executed.

The central unit 404 will command and direct the execution of instructions or portions of software code of the program(s) according to an embodiment of the invention, instructions which are stored in the hard disk 420 or in the read-only memory 406, or in the aforementioned other storage components. At the time of powering up, program(s) which are stored in nonvolatile storage, such as the hard disk 420 or the read-only memory 406, are transferred to the random-access memory 408 which then contains the executable code (or computer/machine executable instructions) of the program(s) according to an embodiment of the invention, as well as the registers for storing the variables and parameters necessary for implementation of the invention.

It will be appreciated that, to meet specific needs, a person competent in the field of the invention will be able to make modifications to the preceding description. Embodiments of the invention are not limited to the forms of realization described, other variants and combinations of characteristics are possible.

This invention has been described and illustrated in this detailed description in reference to the attached figures. However, this invention is not limited to the forms of realization presented. By reading this description and the attached figures, a person skilled in the field of the invention may deduce and implement other variants and embodiments.

In the claims, the terms "contain," "comprising," "including" and "having" do not exclude other elements or other steps. The use of the singular does not exclude the plural. A single processor or several other units may be used to implement the invention. The various characteristics presented and/or claimed may be combined advantageously. Their presence in the description or in the various dependent claims does not, in fact, exclude the possibility of combining them. Reference characters should not be construed to restrict the scope of the invention.

The invention claimed is:

1. A computer implemented process of encoding of at least one compilable source code file for obtaining at least one executable binary file that is executable by compilation of the at least one compliable source code file according to at least one instruction file, the process comprising:
   obtaining at least one source file and the at least one instruction file, the at least one source file being a compilable source code file;
   obtaining a plurality of encryption keys, at least two keys from the plurality of encryption keys being of different types, each type of encryption key being associated with a particular access right to the at least one source file;
   selecting each of the keys from the plurality of encryption keys and
      encrypting the at least one source file according to the key selected such that each of the at least one source file is encrypted with each of the plurality of encryption keys and
      generating the at least one source file encrypted according to the key selected; and
   generating a package containing the at least one instruction file and the at least one source file encrypted according to each key of the plurality of encryption keys.

2. The computer implemented process according to claim 1, further comprising obtaining at least one source file to which access is free, the generated package containing the at least one obtained source file to which access is free.

3. The computer implemented process according to claim 1, wherein the encrypting, executed for each key of the plurality of keys, further includes compressing the at least one source file.

4. The computer implemented process according to claim 1, comprising encoding a plurality of source files, the source files of the plurality of source files being organized in a hierarchical tree structure, at least one key of the plurality of cryptographic keys being associated with at least one node of the tree structure, the at least one key associated with the at least one node being used to encrypt all of the source files associated with the node and with lower-level nodes connected to the node.

5. The computer implemented process according to claim 1, further comprising transmitting the package generated.

6. A computer implemented process of decoding a package generated according to claim 1, the process comprising:
receiving a source package;
obtaining a cryptographic key;
selecting at least one set of data from the source package received based on a type of the cryptographic key; and
decrypting the at least one set of data using the cryptographic key.

7. The computer implemented process according to claim 6, further comprising compiling data resulting from the decrypting of the set of data.

8. The computer implemented process according to claim 6, further comprising editing data resulting from the decrypting of the at least one set of data.

9. A non-transitory computer readable medium including a computer program comprising instructions that, when read by a machine, causes the machine to perform the following:
obtain at least one source file and at least one instruction file, the at least one source file being a compilable source code file;
obtain a plurality of encryption keys, at least two keys from the plurality of encryption keys being of different types, each type of encryption key being associated with a particular access right to the at least one source file;
select each of the keys from the plurality of encryption keys and
encrypt the at least one source file according to the key selected such that each of the at least one source file is encrypted with each of the plurality of encryption keys and
generate the at least one source file encrypted according to the key selected; and
generate a package containing the at least one instruction file and the at least one source file encrypted according to each key of the plurality of encryption keys.

10. A computer device comprising:
one or more processors and at least one memory coupled to the one or more processors, the one or more processors being configured to:
obtain at least one source file and at least one instruction file, the at least one source file being a compilable source code file;
obtain a plurality of encryption keys, at least two keys from the plurality of encryption keys being of different types, each type of encryption key being associated with a particular access right to the at least one source file;
select each of the keys from the plurality of encryption keys and
encrypt the at least one source file according to the key selected such that each of the at least one source file is encrypted with each of the plurality of encryption keys and
generate the at least one source file encrypted according to the key selected; and
generate a package containing the at least one instruction file and the at least one source file encrypted according to each key of the plurality of encryption keys.

11. The computer implemented process according to claim 1, wherein a first key of the at least two keys of different types is of a first type and associated with an accessing or editing right, and wherein a second key of the at least two keys of different types is of a second type and associated with a compilation right.

12. The computer implemented process according to claim 1, wherein the encryption of the at least one source file is asymmetric.

13. The computer implemented process according to claim 4, wherein the plurality of encryption keys are organized in the hierarchical tree structure, each key of the plurality of encryption keys being associated with a node of the hierarchical tree structure and permitting access to all source files associated with lower-level nodes.

14. The computer implemented process according to claim 4, wherein the plurality of source files in the tree structure are compressed, and wherein accessing, editing, and compilation rights associated with the plurality of source files are managed by a respective level in the hierarchical tree structure.

* * * * *